March 9, 1954 M. LEBEDINSKY 2,671,825

AMPLIFYING EQUIPMENT FOR LONG-DISTANCE TELEPHONE CABLES

Filed Jan. 16, 1950 6 Sheets-Sheet 1

INVENTOR:
MYRON LEBEDINSKY
By Wenderoth, Lind & Ponack
ATTORNEYS

AMPLIFYING EQUIPMENT FOR LONG-DISTANCE TELEPHONE CABLES

Filed Jan. 16, 1950 6 Sheets-Sheet 2

MYRON LEBEDINSKY
BY:
Henderoth, Lind & Ponack
Attorneys

INVENTOR:
MYRON LEBEDINSKY
By Wenderoth, Lind & Ponack
ATTORNEYS

March 9, 1954 M. LEBEDINSKY 2,671,825

AMPLIFYING EQUIPMENT FOR LONG-DISTANCE TELEPHONE CABLES

Filed Jan. 16, 1950 6 Sheets-Sheet 4

INVENTOR:
MYRON LEBEDINSKY
By Wenderoth, Lind & Ponack
ATTORNEYS

MYRON LEBEDINSKY
BY: Wenderoth, Lind & Ponack
Attorneys

INVENTOR:
MYRON LEBEDINSKY
By Wenderoth, Lind & Ponack
ATTORNEYS

Patented Mar. 9, 1954 2,671,825

UNITED STATES PATENT OFFICE 2,671,825

AMPLIFYING EQUIPMENT FOR LONG-DISTANCE TELEPHONE CABLES

Myron Lebedinsky, Neuilly-sur-Seine, France, assignor to Societe Anonyme de Telecommunications, Paris, France, a body corporate of France Application January 16, 1950, Serial No. 138,902

Claims priority, application France January 26, 1949

4 Claims. (Cl. 179—98)

The present invention relates to new and simplified amplifying equipment for long distance telephone cables which equipment is extensively utilized in order to compensate for the signal attenuation in long distance telephone communication. The new and simplified arrangement of the amplifying center in accordance with the invention reduces the cost of the amplifying equipment and is particularly effective in shortening the cable forms to thereby prevent troublesome "cross-talk" in the long distance telephone cables.

In explanation of the construction and advantages of the invention, reference is made to the association of elements in the amplifying station and as shown in Fig. 1*a* of the annexed drawings, the elements particularly referred to being the following:

Cable supports and line transformer racks *a*.

Main distribution frame *b*.

Row of members *c*, *d*, *e*, etc.

Disconnection table *f* for the supervising of the circuits ending in the station.

Test desks *g* for the direct current and for the alternating current.

The power supply (not illustrated).

The functions of these elements are described as follows:

1. The cable support and line transformer rack *a* are the terminating point and the starting point respectively for the underground cables *h* and *h'*. The essential element is the so-called "cable distribution head," the first testing point of the station and through which one can have access to all the cable conductors. Line transformers and/or repeating coils are associated with the cable distribution head and one of their functions, amongst others is to electrostatically separate the line from the rest of the equipment.

2. The main distribution frame *b* is an element which, as it can be understood from its name, enables the interconnection of the various component devices of the station. It includes elements called distribution strips on which abut the admission terminals of the component devices so that the interconnection of the component devices may be performed by means of soldered metal junctions, named jumpers.

3. Each row of members, *c*, *d*, *e* carries the component devices relating to the cable circuits (amplifiers, call retransmitters, etc.). The rows are arranged in racks, usually eight in number on a sort of steel frame and in which can be placed the component devices. As said above, the terminals of these component devices are connected to the main distribution frame by means of connection cables *i—i'*, *j—j'*, *k—k'*, carried in racks, these called general "cable runs." These component devices consist of a certain number of blocks contained in metal housings or "boxes of members." Inside these boxes and on the racks the necessary connections are made with insulated conductors and tied strands, named "cable forms."

4. The chief function of the "disconnection table" *f* is to furnish the last access point to the telephone circuits before their connection (zone centers). In this table, each circuit is provided with testing points called "jacks," allowing the staff in charge of the supervising and the maintenance to test the circuits by plugging in the convenient plug.

5. The "test desks for the continuous and for the alternating current" *g*, is used for detecting communication defects in the cable, in the circuits and the components.

6. The "power supply" receives the energy from the local supply circuit, transforms it and distributes it to the components which are usually equipped with vacuum tubes.

The power supply comprises:

The high voltage installation, located between the supply circuit and the local machinery.

The components thereof and the starting desk.

The batteries of accumulators.

The distribution desk to send the current to the row of devices called "suite of A positions."

Up to now, this elemental distribution has been structurally based upon the above functional categories, and in practice the setting up of a station follows closely this logical distribution.

According to this conception and on account of the ground space required by the equipment, it has become necessary to separate at various places of the station, more or less distant from each other, the cable distribution heads, line transformers, amplifiers, disconnecting jacks, etc., belonging to a same circuit. These components are connected by means of connection cables, which, for a circuit comprising four ordinary conductors, have a length of 150 meters to 200 meters in a station of average size. This installation requires that numerous measures of precaution be taken to avoid the circuit couplings called "cross talks," without nevertheless entirely succeeding in cutting them off. In addition, this arrangement necessitates a sizable operating staff.

It is an object of the present invention to provide a new and improved arrangement of the different elements of the equipment of an amplifying center or of a station using a long distance working stock, which results in an important simplification in the construction, operation and maintenance of these centers or stations and permits the size of the operation and maintenance staff to be materially reduced.

Another object of the invention is to distribute the components in the amplifying centers or stations using a long distance working stock so as to suppress the main distribution frame.

A further object of the invention consists in a distribution of the components of the amplifying centers or stations using a long distance working cable, wherein the equipment comprises at least one supporting frame for the circuits to the cables, the frame formed of vertical and horizontal bars and of cable heads, or boxes consisting of uniformly spaced vertical partitions mounted on the bars, the boxes being provided with plates carrying contact sockets in pairs, each socket pair for a cable circuit, distributing elements and connecting elements connecting the circuits to the cable heads, a plurality of chassis cells mounted in the frame so that each cell is mounted between two adjacent cable heads, blocks containing the circuit components mounted in adjacent cells of the chassis, contact sockets on the side edges of the blocks in front of the contact sockets for the cable heads and connections between these last named sockets, which thereby provides a unit separation of the circuits and suppresses cross-talk coupling and other interference which may arise from the proximity of the cables to each other and from the power supply.

All of the circuit components for the same circuit are arranged in close unit relation and placed on the same row, thereby permitting various combinations and interconnections in the row. Thus the row operates, per se, as a station and the prior art difficulties with the main distribution frame having the components in several rows are substantially eliminated.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

As diagrammatically shown on Fig. 1*b* of the annexed drawings, in a station arranged according to the invention, the underground cables *h*, *h'* are subdivided in two groups *l*, *m*, and *l'*, *m'* respectively connected with the rows *n*, *p*, relating to the circuits belonging to these two groups, each row comprising all the necessary components (translators, amplifiers, modulators, demodulators, signalling sets, call retransmitters, etc.), the interconnections between these components being effected in the row by means which are described later in greater detail.

The inspection of the circuits and the necessary measurements are carried on by means of a test desk *r*, which is movable along the rows and equipped with test cords so as to be connected with the corresponding terminals of the components placed in the row, this test desk taking thereby the place of the disconnection table in the known equipment.

The frame of the row is made of a succession of metal elements, lined side by side: these elements are not specialised so that any kind of apparatus can be mounted in them. The term "any kind of apparatus" refers to the components of normal use, in the amplification, modulation or signalling technics and usually called two wire repeaters, four wire repeaters, modulators, demodulators, signalling sets, channel-cases, sender-receivers of voice frequency telegraphy, etc.

The number of the blocks constituting each apparatus is reduced so that it becomes no longer necessary to group these blocks in a casing with a cable form to connect them to each other. The blocks are individually placed in the row, and afterwards connected with very simple means. This suppression of the casings, of the cable forms of the components and also of the cable forms of the racks in accordance with the invention, permits a reduction in the cost of construction and operation, and is one of the main objects of the invention. Furthermore, since the elements of the iron frame are not specialized, modifications may be readily made and the installation may be even more rapidly assembled by using a special type of cable which is prefabricated to fit in the installation.

This arrangement is completely suited for the distribution, supervision, and maintenance measures for the circuits and makes it conveniently possible to eliminate the main distribution frame, the disconnecting desk and the test desk for the alternating current, and to integrally maintain and include in the general equipment the functions of these devices.

In short, this arrangement of the machinery is suited for all the switching requirements of automatic traffic.

Owing to the above characteristics, the various elements of the plant are in a reduced space within easy reach of the maintenance staff, permitting thereby a reduced staff which can operate more rapidly than heretofore.

As a non limiting example, and to make the invention easier to understand, a description of the invention and illustration thereof in the drawings is given, these figures given as an example but these figures may vary in other embodiments meeting also the characteristics of the invention.

Figs. 1*a* and 1*b*, above described, show respectively in a diagrammatic way, a known station and a station according to the invention.

Fig. 1*c* shows in perspective view the frame of an apparatus.

Figure 1A:
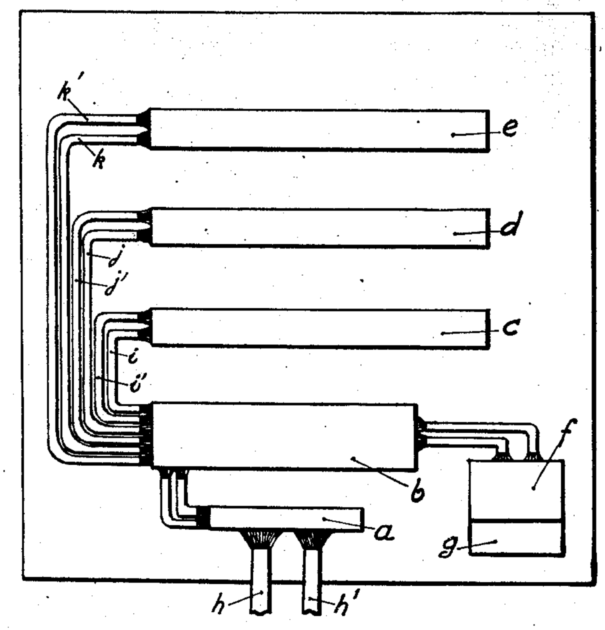
Figure 1B:
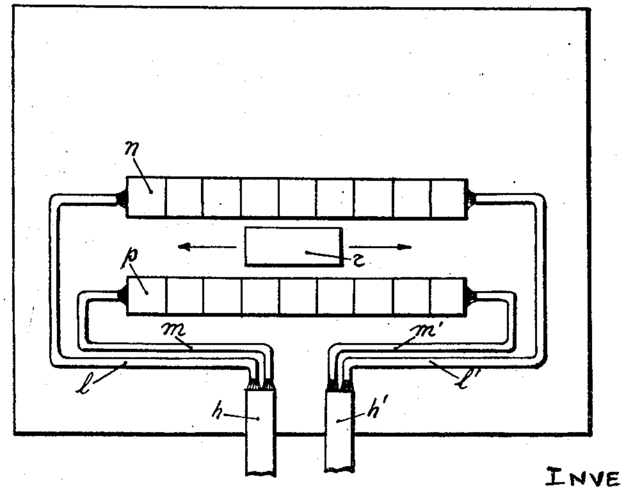
Figure 1C:
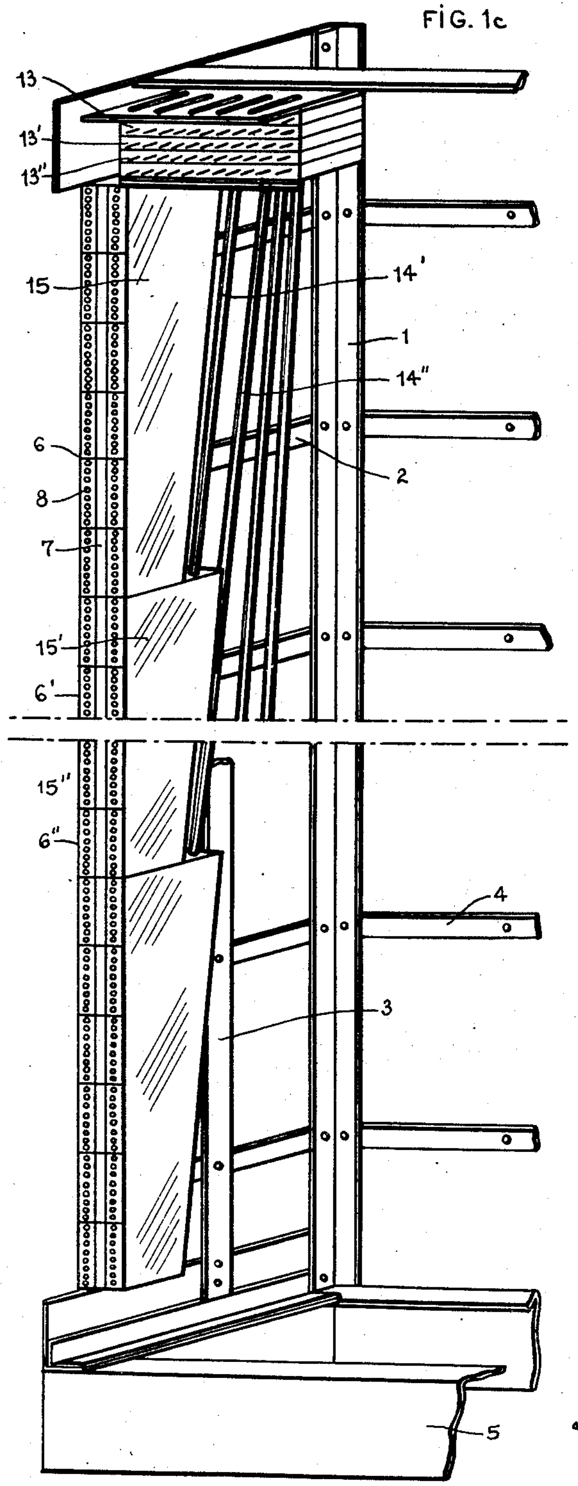

According to the embodiment shown on Fig. 1*c*, the frame of the row is constituted by the assembly of vertical identical elements, consisting essentially of an angle iron upright 1 and of horizontally disposed iron bars 2 which are perpendicular to the upright and cross braced by a flat vertical iron bar 3.

These elements are placed in parallel lines and joined, at regular intervals, with horizontal flat iron bars 4. Two lines of elements can be assembled back to back and form a row equipped on both sides.

The upper part, not shown, is used for the connections and is closed with removable sheet iron pieces.

The lower part consists of a pedestal 5 which can be reserved for the feeding elements.

In the shown embodiment, the figures are approximately as follows, the equipment being included:

| | M. |
|---|---|
| Height under the upper part | 2.630 |
| Height with the upper part | 2.930 |
| Depth (one side row) | 0.225 |
| Depth (double side row) | 0.450 |
| Axis interval of the elements | 0.117 |
| Length of the row | 5.650 |

(This length corresponds to 48 axis intervals of 117 mm. in addition to an end element.)

The above figures can vary according to the size of the rooms.

Each vertical element 1 in the row carries a stated number of cable distribution heads 6, 6', 6'' . . . (five in the shown embodiment), placed end to end, each consisting of a certain number of small plates 7 equipped with connecting sockets 8.

Figure 3:
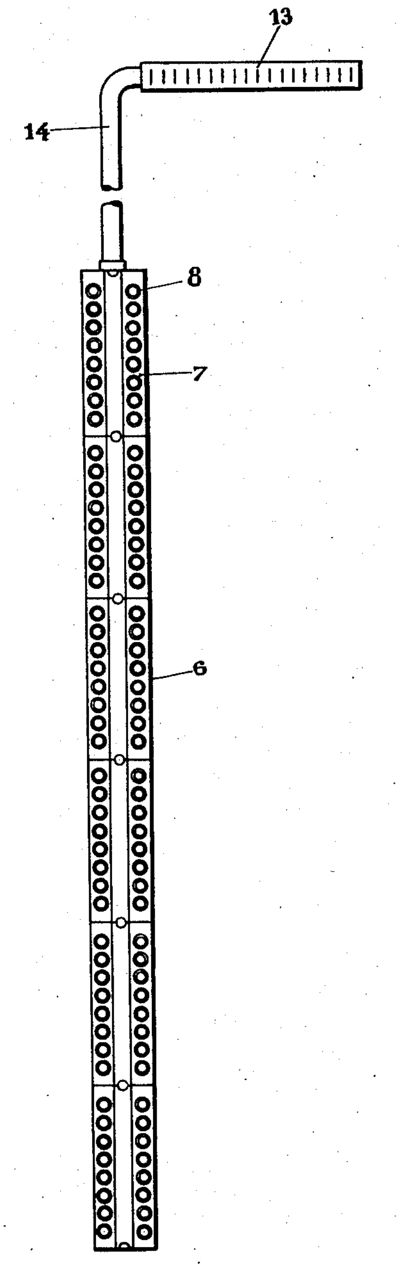
Fig. 3 and Fig. 4 show respectively a front view and a profile view of a row element used as a cable distribution head.
Figure 4:
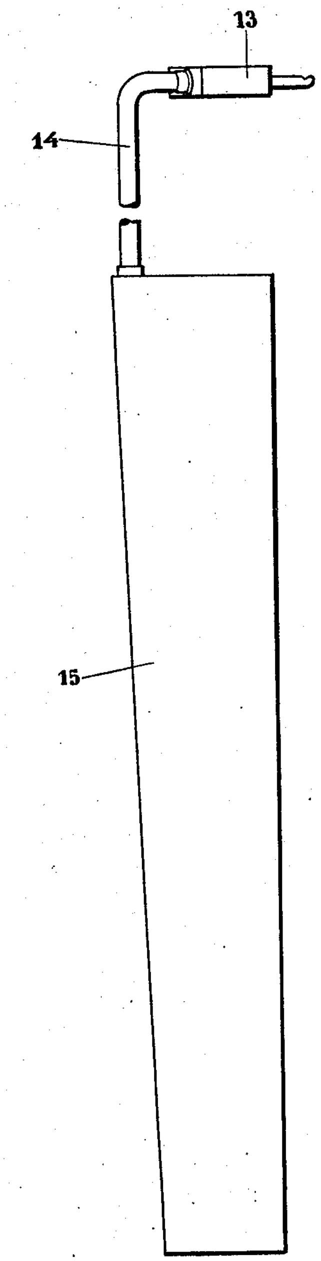

The Figs. 3 and 4 show on a larger scale such a cable distribution head.

Figure 2:
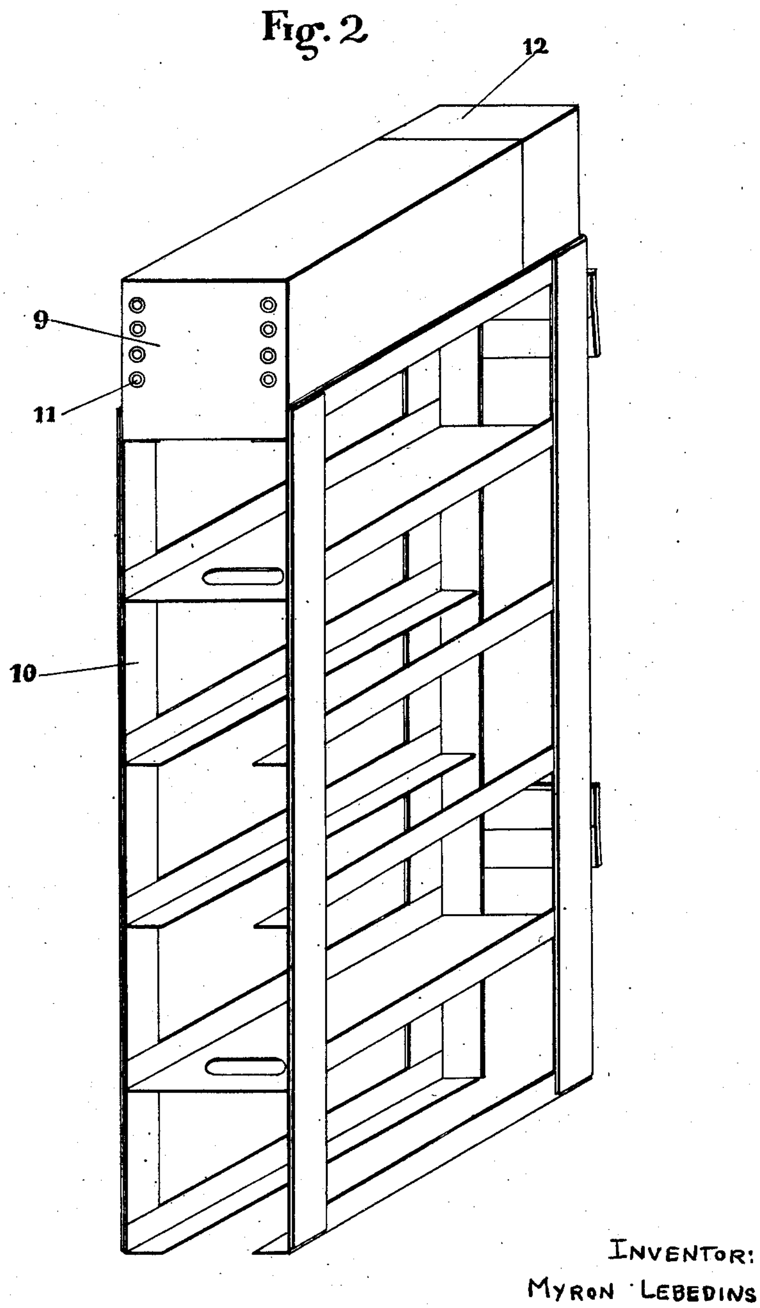

The devices are constituted by elemental blocks. As shown on Fig. 2 the blocks 9 rest on frames 10 made of folded and welded iron sheets, and arranged so as to form vertical lines of cells in which the blocks are individually placed. The blocks are equipped with sockets 11 which receive staples to establish the connection with the cable distribution head sockets 6.

Whenever components belonging to a same group include electrical elements varying according to the channel or to the frequency, these elements are placed in a removable part of the elemental block 12.

In the described embodiment, the blocks have a base of 80 mm. x 80 mm.; the height perpendicular to the row face is a multiple of 16 mm., i. e. $11 \times 16 = 176$ mm.

To provide the connections of the components, with the telephone circuits or with the feeding points, connecting strips, with horizontal contacts 13, 13', 13'', each of them corresponding to a cable support 6, 6', 6'', are disposed at the upper part of the row (Fig. 1). The tags of the strips are connected with the corresponding cable distribution head sockets by means of junction cables 14, 14', 14''. These cables, preferably made of pair cables under screen, covered for instance with a metal polyethylene insulated braid are fanned to connect said pairs with the corresponding sockets inside of hopper shaped cases 15, 15' 15'', fixed behind each cable distribution head and in which, when the connections are established, an insulating material is poured according to the customary practice.

Between the cable distribution heads 6 of two vertical adjacent elements, the block bearers 10 are disposed in the row of the blocks containing the components; these block bearers rest on the horizontal jointing irons 2.

Figure 5:
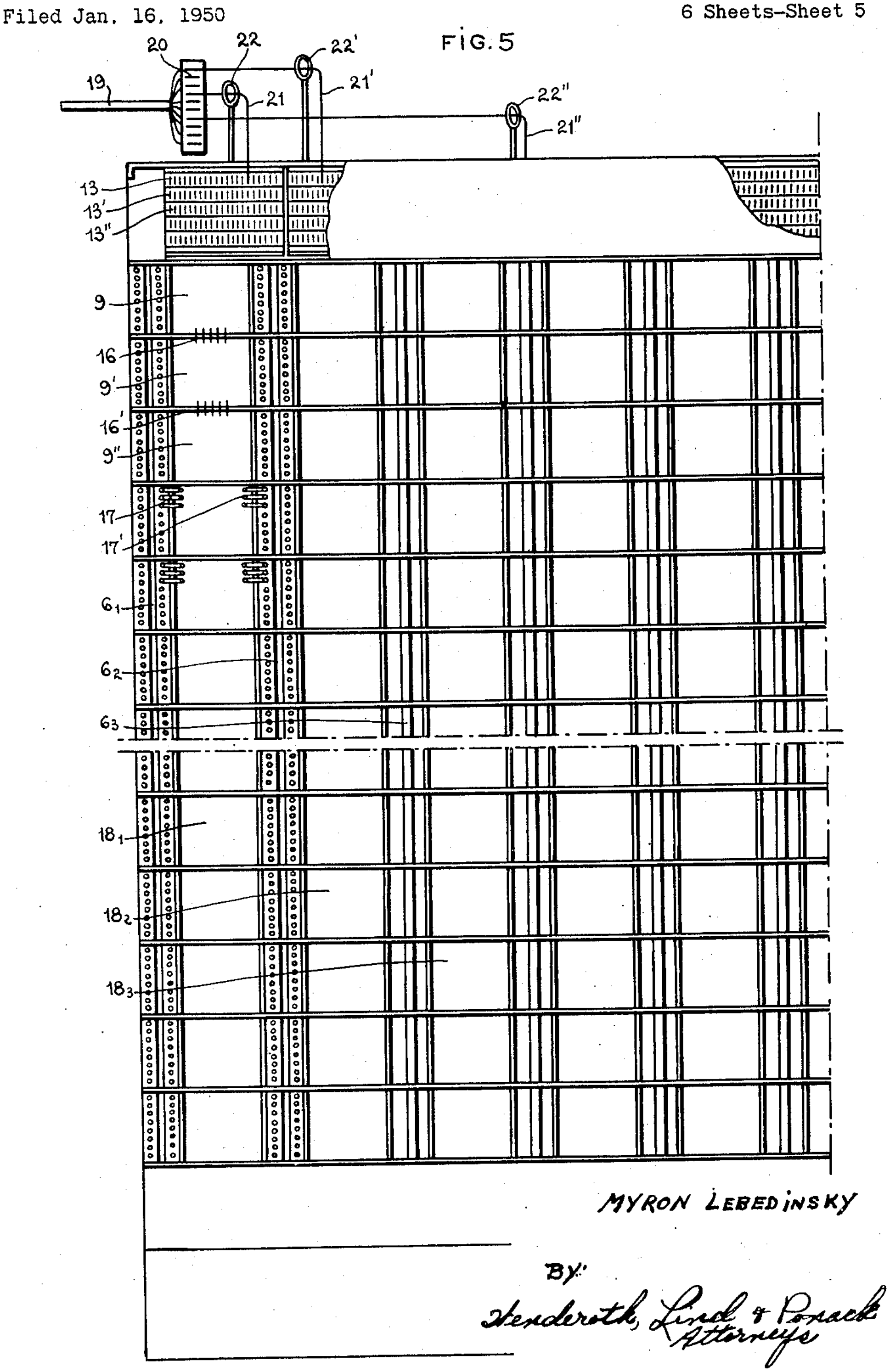
Fig. 5 is a front view of a rack.

As shown on Fig. 5, the row equipment appears as vertical lines $18_1$, $18_2$, $18_3$ of blocks 9, 9', 9'', alternating with the cable distribution heads $6_1$, $6_2$, $6_3$ . . . . Each block 9 can be connected by means of connectors, either with the cable distribution head on the right, either with the cable distribution head on the left, or with both heads simultaneously according to the required connections. The elemental blocks of an apparatus can be placed above each other in a single vertical line or disposed side by side in several adjacent vertical series.

In the first case, the connections between the blocks are obtained straight with straps 16 between the strips of terminals of the blocks. In the second case, the connections between the blocks are performed through the cable distribution head placed between the two blocks to be connected by means of connectors 17, the necessary sockets being connected inside the head.

The telephone circuits, on the long distance cable side, are connected as follows:

From the general cable distribution head, terminal of the underground trunk cable, start towards the row, junctions 19, made of lead covered multiquad pairing cables; they pass through the upper part of the row to end on strips with bayonet sockets 20, vertically arranged in this upper part.

These strips makes it possible to distribute the cable quads through the row by means of under screen quad jumpers 21, 21', 21'' which connect them with the horizontal bayonet sockets of the strips of the row and are guided by suitably disposed ring sets 22, 22', 22'' fixed on the upper part of the frame.

In the case of an intermediate or nodal station, a similar distribution is performed, starting of the cable heads of the other cables. Other jumpers are passed between the corresponding vertical strips and the horizontal strips of the row.

The telephone circuits, on the trunk service side, are connected as follows:

The junctions, made of lead covered multitwin-cables, starting from the trunk exchange, run through the upper part of the row and end in the strips of bayonet sockets vertically disposed in said upper part, like the strips 20.

The distribution is carried on, as in the preceding case, according to the working needs by means of jumpers which are disposed between these strips and the horizontal strips of tags of the row.

To render the operation as flexible as possible, when a station includes several rows, junction cables are set out between these rows, allowing in case of need, to connect an apparatus belonging to a row with a trunk circuit, the terminal strip of which is placed on another row.

The interconnections of apparatuses belonging to a same circuit are made as follows:

The components of a same circuit are generally placed in the row in cells lined up horizontally and disposed in several adjacent vertical series; in such a case, the connections are set, as above indicated, for the connections between the blocks of a same apparatus, with staples, and the sockets of the cable heads.

In the other cases, the junctions are established with jumpers to connect the tags of the upper strips, corresponding to the series in which are placed the apparatuses to be connected.

For the feeding circuit, the energy cables pass through a special partition in the upper part of the row.

Shunt circuits are prepared in the vicinity of the series of the blocks requiring a feeding. These shunt circuits consist of a circuit breaker, by means of staples or locking bars, and of a connecting strip from which start the connections with the equipment, said connections being sheltered as in the past, either by fuses or by resistance lamps. A row may be equipped with either of the apparatuses used for the low frequency transmission; two wires repeaters, four wires repeaters, two and three stage modulators, signalling sets, transformer units, balancing networks, etc., and, for the high frequency transmission, such as: twelve channels terminating set, equalizer units, etc.

Many arrangements can be realized according to the required groupings between the apparatuses and according to the desired repartition of the telephone trunk cable terminals on the row.

These terminals can either be placed with the corresponding transformers in the immediate vicinity of the apparatuses, giving thereby a direct connection, either collected in vertical series in the middle of the row.

Figure 6:
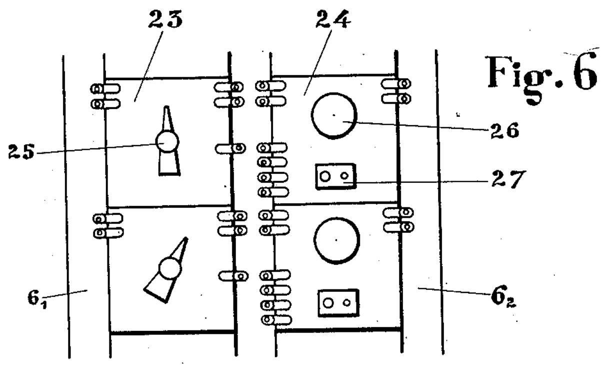
Figs. 6, 7 and 8 are schematic views of the circuit components used in the invention.

As examples, some equipments are described hereafter:

In the case of the two wires repeaters (Fig. 6) each amplification direction comprises two blocks, 23, 24; the potentiometer 25 occupies the apparent surface of a block, the five electrodes valve 26 and the sockets 27 for the measurement of anode voltage occupy the other block. These blocks are placed in two adjacent vertical series.

The balancing network, the blocking condensers and the differential transformer are collected at each end in a block which can be placed either in a vertical series close to the preceding series with the line transformer units, either in any other place on the row.

Figure 7:
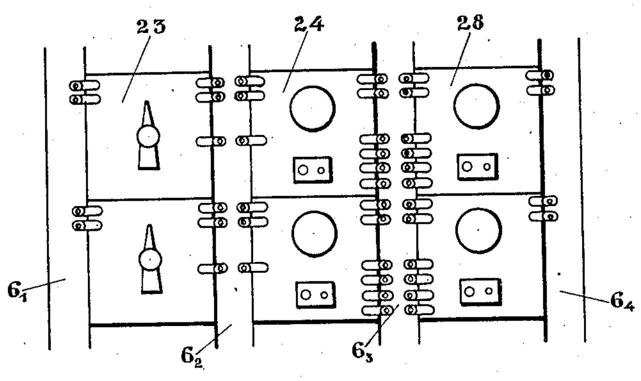

In the case of the four wires two stages repeaters (Fig. 7), the blocks are placed in the same manner: the second stage of amplification is held in a third block 28, which is horizontally placed after the two others, 23, 24.

In the case of the two or three channels modulator-demodulators, the elements corresponding to each channel are collected in two adjacent vertical series as for the two wires repeaters.

In the case of the twelve channels terminating sets, the blocks of the cases for two twelve channel terminating sets 60/108 or for a twenty four channel terminating set, are lined on three vertical series occupying all the height of the row.

Figure 8:
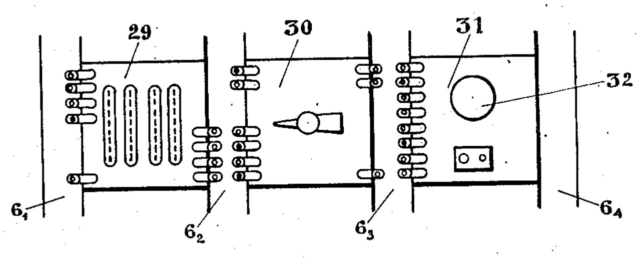

Each channel needs (Fig. 8) three blocks 29, 30, 31, horizontally placed, one block for the transmitting way, one block for the receiving way and the third block for the amplifier 32.

The line filters are collected in a removable block, placed at the end of the transmission and reception blocks.

The general elements are collected in the upper cells.

A test desk *g* (Fig. 1*b*), movable along the row, may be used for the upkeep measurements and the inspection of the circuits reported to be in fault.

This table is equipped so as to operate instead of the disconnection table and is therefore coupled by cords with the groups of three jacks disposed in the blocks associated with the termination circuits.

The emergency repairs are effected by a simple substitution of the faulty blocks in the series, suppressing thereby transfers with cords and numerous junction wires.

For this purpose, a few spare parts comprising blocks of the different types of components are kept in store in the station. In the case of the twelve channels 60/108 terminating sets, a small number of elemental blocks, in common with all the lines and a few removable line filters allow to face any emergency.

The melting of fuses are reported as usual.

What I claim is:

1. Equipment for amplifying centers for long distance telephone cables, comprising at least one supporting frame corresponding to a number of circuits of said cables, said frame being formed by vertical bars, horizontal bars and cable heads consisting of uniformly spaced vertical partitions supported by said bars and made of flat hollow boxes provided on the front face thereof with plates carrying pairs of contact sockets, each of said socket pairs corresponding to one of said circuits, distributing elements connected to said circuits at the end of the cable, connecting elements between said distributing elements and the contact sockets of the cable heads, a plurality of vertical chassis cells mounted in the frame, each chassis cell being mounted between two adjacent vertical cable heads, a series of blocks containing the apparatus belonging to each of said circuits respectively, all of the blocks belonging to the same circuit being mounted in adjacent cells of the chassis, contact sockets provided on said blocks along the side edges thereof in front of the contact sockets of the cable heads and connections between the sockets on the blocks and the sockets on the cable heads, whereby the circuits are connected to the corresponding apparatus and the apparatus of a same series of blocks are connected to each other.

2. Equipment for amplifying centers for long distance telephone cables, comprising at least one supporting frame corresponding to a number of circuits of said cables, said frame being formed by vertical bars, horizontal bars and by cable heads consisting of uniformly spaced vertical partitions supported by said bars, each frame provided with a row of vertically assembled hopper shaped boxes on the front face thereof and with plates carrying pairs of contact sockets, each of said socket pairs corresponding to one of said circuits, horizontal strips provided at the upper part of the frame corresponding to the hopper shaped cable heads and carrying a number of terminals equal to the number of contact sockets of the corresponding cable head, connecting cables between each of said terminals and one of the cable head sockets, vertical strips provided with terminals connected to the circuits of the cable and jumper connections between the terminals of the vertical and of the horizontal strips respectively, a plurality of vertical cellular chassis mounted in the frame, each chassis cell being between two adjacent vertical cable heads, a series of blocks containing the apparatus belonging to each of said circuits respectively, all of the blocks belonging to the same circuit being mounted in adjacent cells of the chassis, contact sockets provided on said blocks along the side edges thereof in front of the contact sockets of the cable heads and connections between the sockets on the blocks and the sockets on the cable heads, whereby the circuits are connected to the corresponding apparatus and the apparatus of a same series of blocks are connected to each other.

3. Equipment for amplifying centers for long distance telephone cables, comprising at least one supporting frame corresponding to a number of circuits of said cables, said frame being formed by vertical bars, horizontal bars and cable heads consisting of uniformly spaced vertical partitions supported by said bars, each frame provided with a row of vertically assembled hopper shaped boxes on the front face thereof and with plates carrying pairs of contact sockets, each of said socket pairs corresponding to one of said circuits, a number of horizontal strips provided at the upper part of the frame, corresponding to the hopper shaped cable heads and carrying a number of terminals equal to the number of contact sockets of the corresponding cable head, connecting cables between each of said terminals and one of the cable head sockets, vertical strips having terminals and bayonet sockets provided at the upper part of the frame, a lead covered multiquad pairing connected at one end to the corresponding wires of the cable circuits and at the other end to said bayonet sockets, jumper connections between the terminals of the vertical strips and the tags of the horizontal strips, a plurality of vertical chassis cells mounted in the frame, each chassis cell being between two adjacent vertical cable heads, a series of blocks containing the apparatus belonging to each of said circuits respectively, all of the blocks belonging to the same circuit being mounted in adjacent cells of the chassis, contact sockets provided on said blocks along the side edges thereof in front of the contact sockets of the cable heads, connections between the sockets on the blocks and the sockets on the cable heads, whereby the circuits are distributed over the frame and connected to the corresponding apparatus respectively and strap connections between the vertically superposed blocks of the same series.

4. An equipment for amplifying centers for long distance telephone cables, comprising at least one supporting frame corresponding to a number of circuits of said cable, said frame being formed by vertical and horizontal bars and by cable heads consisting of uniformly spaced vertical partitions supported by said bars, each made by a row of vertically assembled hopper shaped boxes provided on their front face with plates carrying a number of pairs of contact sockets, each of said socket pairs corresponding to one of said circuits, a number of horizontal strips provided at the upper part of the frame, each corresponding to the hopper shaped cable box and carrying a number of terminals equal to the number of contact sockets of the corresponding cable head, connecting cables between each of said terminals and one of the cable head sockets, vertical strips having terminals and bayonet sockets provided at the upper part of the frame, a lead covered multiquad pairing connected at one end to the corresponding wires of the cable circuits and at the other end to said bayonet sockets, jumper connections between the terminals of the vertical strips and the terminals of the horizontal strips, a plurality of vertical chassis cells mounted in the frame, each chassis cell mounted between two adjacent vertical cable heads, a series of blocks containing the apparatus belonging to each of said circuits respectively, all of the blocks belonging to the same circuit being mounted in adjacent cells of the chassis, contact sockets provided on said blocks along the side edges thereof in front of the contact sockets of the cable heads, connections between the sockets on the blocks and the sockets on the cable heads, whereby the circuits are distributed over the frame and connected to the corresponding apparatus respectively, strap connections between the vertically superposed blocks of the same series, a test desk movably arranged along the supporting frame, groups of three jacks on the blocks associated with the terminal circuits, and a junction cord connected to said desk whereby said desk may be connected to the last mentioned blocks.

MYRON LEBEDINSKY.

References Cited in the file of this patent

UNITED STATES PATENTS

| Number | Name | Date |
|---|---|---|
| 1,442,456 | Whiting | Jan. 16, 1923 |
| 1,492,309 | Ogden | Apr. 29, 1924 |
| 1,809,025 | Cruser | June 9, 1931 |
| 1,811,753 | Hovland | June 23, 1931 |
| 1,880,072 | Christian | Sept. 27, 1932 |
| 1,882,854 | Mead | Oct. 18, 1932 |
| 1,930,275 | Knowlton et al. | Oct. 10, 1933 |
| 2,065,897 | Kenner et al. | Dec. 29, 1936 |
| 2,077,160 | Wilson | Apr. 13, 1937 |
| 2,103,501 | Waldron et al. | Dec. 28, 1937 |
| 2,208,917 | Weissner | July 23, 1940 |
| 2,287,243 | Hebert | June 23, 1942 |
| 2,488,372 | Breisch | Nov. 15, 1949 |
| 2,512,908 | Arndt | June 27, 1950 |